Patented Sept. 22, 1953

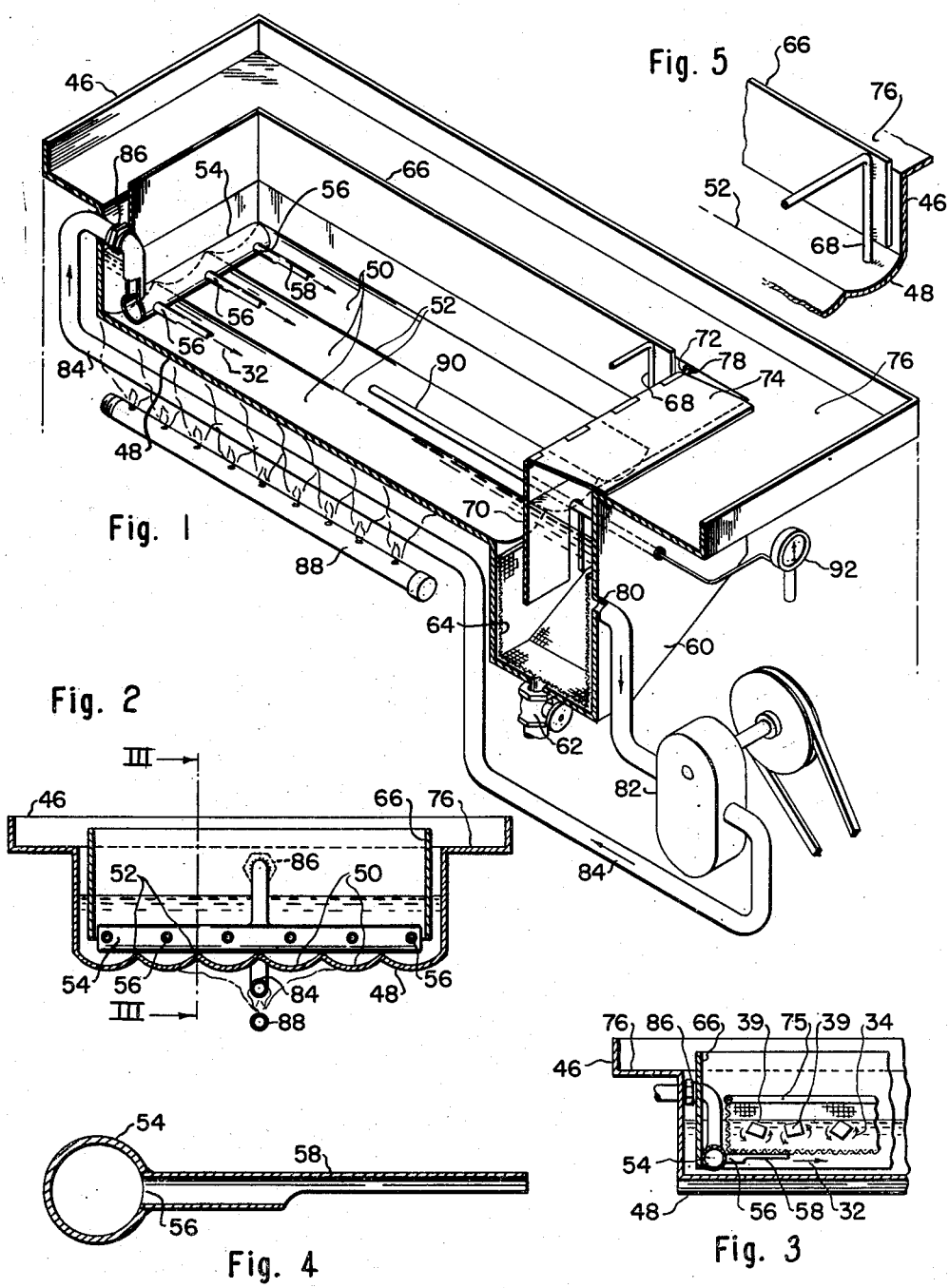
Sept. 22, 1953    K. L. CHILDS    2,652,767
FRYING APPARATUS
Filed Nov. 27, 1948
INVENTOR
KENNETH L. CHILDS
BY Edward W Fearing
ATTORNEY

2,652,767

UNITED STATES PATENT OFFICE 2,652,767

FRYING APPARATUS

Kenneth L. Childs, New Haven, Conn., assignor to Artisan Metal Products, Inc., Waltham, Mass., a corporation of Massachusetts Application November 27, 1948, Serial No. 62,255

5 Claims. (Cl. 99—408)

1

The present invention relates to frying apparatus and more particularly to refinements and efficiency increasing improvements in kettles and pans of relatively shallow construction in which small quantities of fat or oil are employed to treat food articles while retaining all the advantages of frying apparatus employing large bulk quantities of fat. Kettles and pans of the shallow type are exemplified in United States Letters Patent Nos. 2,219,949 and 2,219,950, granted October 29, 1940, and No. 2,248,659, granted July 8, 1941, all on application of the present inventor.

As a general rule successful frying operations can be accomplished only if the temperature of the fat surrounding food articles being treated are maintained at least as high as 300 degrees Fahrenheit. Below this temperature the surface of food articles, for instance French fried potatoes, fish or doughnuts, begins to soak up the fat particularly when first immersed. Above this temperature cold articles of food are seared along their outer surfaces so that most of the pores are sealed against fat entrance and the continued frying operation forces steam out the remaining unsealed pores.

With large bulk frying kettles proper frying temperatures are maintained through heat storage in a relatively large volume of fat as compared with the volume of food immersed therein. When cold food is first introduced into a large bulk kettle the fat is circulated by convection currents only, the hot fat rising and the cooled fat descending into the deeper portions of the kettle. With shallow kettles convection currents do not occur to the extent existing in deep kettles and heat storage is ineffective in maintaining proper frying temperatures. In order to prevent reduction of temperature below a proper value in a shallow kettle as disclosed in the prior patents as above noted, heat is transferred as rapidly as possible to the fat when cold food is first introduced in an effort to maintain proper frying temperature thereafter throughout the frying operation. To assist in rapid transfer of heat to the fat in the patented kettles, the kettles are provided with foam controlling rims or guards, spaced from the sides of the kettles to separate from the frying zone formed thereby, a supply of heated fat rendered available as foaming subsides after introducing a load of cold food articles. While such an arrangement is very desirable and effective at a crucial time in the frying operation, there is a tendency for the temperature to sag as soon as the heat of the

2 separated fat supply is absorbed by contact with the food. Thereafter, the transfer of heat to the fat in the kettle may lag behind the heat absorption by the food unless an unusually large heat source is employed. Where a large source of heat is used there is danger of overheating and injury to the kettle supporting structure as well as of a correspondingly increased fire hazard.

It is accordingly an object of the present invention to provide a simply constructed frying apparatus with a relatively shallow kettle in which a more rapid transfer of heat to the fat is possible than heretofore without the use of an excessively large heat source and its attendant difficulties. Preferably, the heat is transferred through the bottom of the kettle. Another object of the invention is to improve the construction of shallow frying kettles or pans and to render them safer in operation, freer from fire hazard and capable of effecting a better result with less care and attention on the part of the operator than heretofore. Further objects are to provide means to maintain the bottom of a frying kettle clear of frying residue at all times, particularly when heat is transferred through the kettle bottom, thus avoiding the necessity of frequent cleaning and reducing the rate at which the fat in the kettle disintegrates and becomes distasteful or dangerous from a health standpoint as a frying medium.

To these ends the frying apparatus embodying the features of the present invention includes an inexpensively constructed thin sheet metal kettle having a bottom heated by direct flame contact and an open frying zone containing heated fat or oil of sufficient depth only to immerse a shallow layer of articles to be treated, in which parallel corrugations are formed in the sheet metal bottom of the kettle and a plurality of submerged jets act along the heated kettle bottom, one jet for each valley of the corrugations, a sump being provided at the ends of the corrugations in the bottom remote from the jets. In this embodiment, jet deflecting means in the form of arcuate shields assist in maintaining the projected currents in contact with the kettle bottom.

These and other features of the invention, as hereinafter described and claimed will be readily apparent from the following detailed specification taken in connection with the accompanying drawings, in which:

Fig. 1 is a perspective view of a half-section, cut through a lengthwise vertical plane of a kettle having rectangular form and embodying the features of the present invention;

Fig. 2 is a sectional view of the fat inlet end of the kettle shown in Fig. 1;

Fig. 3 is a sectional view of the kettle taken along the line III—III of Fig. 2;

Fig. 4 is a detail sectional view of an enlarged scale of a jet and a deflecting shield; and Fig. 5 is a detail perspective view of a corner portion of the kettle.

The illustrated form of frying apparatus is a relatively small compact unit having a kettle for treating within an open frying zone food articles arranged in a single layer in fat or oil having an effective depth of from one and one-half to two inches only, raised to a moderately high temperature of between 300 to 400 degrees Fahrenheit. The volume of the kettle is so small that there is relatively little heat storage capacity offered by the fat in the kettle. Consequently, in order to maintain effective frying temperature after a load of cold food is immersed in the fat it has heretofore been necessary to transfer heat rapidly to the fat from an outside source of supply. To do this it is usual to employ a large capacity of heat supply suitably controlled to give the desired results.

According to the present invention a frying apparatus having a similar shallow depth is employed in which there is provided unitary means for enabling heat to be transferred much more rapidly to the fat in the kettle than in prior kettles with the result that the source of heat supply employed may be of substantially reduced capacity. With the use of a reduced capacity heat supply the temperatures to which the different parts of the kettle and supporting structure therefor are heated are correspondingly reduced and the fat in the kettle is not so quickly broken down chemically into a condition of uselessness as a frying medium. In fact, with the improved frying life of the fat and the relatively small quantity employed in the frying apparatus of the present invention it is possible for the first time to carry on continued frying operations indefinitely for all common food articles without changing the fat or cleaning the kettle except for periodic removal of the frying residue. This can be accomplished simply through the use of a quickly removable strainer. These results are rendered possible for the reason that the fried food articles when removed from the kettle carry off a sufficiently large percentage of the fat, so that impure or broken down fat will not accumulate, the fat removed from the kettle with the food being replaced with fresh fat to such an extent that the proportion of contamination from broken down fat is kept at all times well below a safe minimum.

Referring to Figs. 1 and 2 of the drawings, the kettle or pan illustrated is of the same general construction, except as hereinafter described, as those of the patents above noted. The kettle is of sheet metal and is intended to be mounted in a suitable support of refractory metal or fire brick. Within the kettle is a foam controlling rim removably supported in spaced relation to the sides of the kettle to outline an inner frying zone and an outer channel of substantially uniform width for purposes to be described. The kettle has low side walls with a step-like set back below which a useful fat level not over two inches deep is maintained for frying a single shallow layer only of food articles. At one end of the kettle is a sump or sediment well for receiving residue resulting from frying operations. The sump is equipped with a hand operated valve at its bottom through which the kettle is drained.

The illustrated kettle is heated along its bottom surface by direct contact with the open flame of a burner suitably controlled by thermostat inside the kettle. The area to which the heat is applied on the kettle bottom is directly beneath the frying zone with the shortest possible distance between the heated area and the articles being treated in the frying zone. As thus far specifically described the apparatus is similar to that of the prior patents.

The operation of the apparatus of the prior patents is highly efficient and depends for its success, in part, upon the use of heat stored in the channel and, in part, upon the assistance given by the foam controlling rim in producing stronger circulating currents in the fat in the frying zone than would normally occur in an ordinary kettle of such shallow construction. As described in Patent No. 2,219,950, the present foam controlling rim is provided with circulation inducing openings. These openings direct heated fat from the channel against the food articles in the frying zone as soon as the preliminary foaming has subsided after the articles are first introduced. However, the relatively small volume of the channel in both the present and patented construction does not permit the flow of heated fat against the food articles to continue for a sufficient length of time to insure that proper frying temperatures will necessarily be maintained throughout a given frying operation, particularly with high water content food articles. Accordingly, it is necessary in the patented kettles for the heating burner to be constructed with large heating capacity and to be opened up to a maximum output as soon as each new load of food articles is introduced into the kettle. Such manner of operation may subject the kettle and its support to excessive temperatures of dangerous or destructive intensities from a standpoint of fire hazard or durability of the apparatus. Furthermore, the excessive temperatures produced by the burner tend to break down the fat chemically in the kettle and to render it eventually unfit for continued frying operations. After this occurs, the entire volume of fat in the kettle must be discarded and replaced by fresh fat.

In the apparatus of the present invention, the difficulties above noted are avoided and all the advantages of using a shallow frying kettle are retained. To these ends, the illustrated kettle indicated at 46, has a bottom 48 provided with a plurality of corrugations. The corrugations are parallel with uniform spacing and are constructed with valleys 50 of circular section running lengthwise of the kettle. The valleys are joined together by relatively sharp ridges or apices 52 to avoid collecting the residue between the valleys, the entire surface of each corrugation being submerged. At the input end of the kettle there is a manifold in the form of a straight header 54 having jets 56 (see Fig. 4) arranged in spaced parallel relation with the same spacings as the corrugations, a separate jet being located in each valley in the corrugated bottom to sweep the residue from all the valleys. To assist in directing the projected currents downwardly into contact with the heated areas of the kettle bottom, each jet is provided with a deflector 58 extending over the directly heated bottom area in line with the jet.

The deflectors comprise arcuate shields extending substantially beyond the jets and having their concavities facing downwardly toward the valleys of the corrugations, there being provided one shield for each jet. At the opposite end of the kettle is disposed a sump, indicated at 60, with its bottom at a lower level than the valleys of the kettle bottom. The sump being arranged in line with the corrugations receives oil of the residue swept by the projected currents along them. For draining the kettle the bottom of the sump is provided with a hand valve, indicated at 62. Within the sump is a residue strainer 64 arranged for easy removal when it is necessary.

The kettle is provided with a foam controlling rim, indicated at 66, of U-shape secured at the input end wall of the kettle to the manifold or header 54 and supported at the outlet end of the kettle by legs 68 on the rim engaging the bottom of the kettle. The legs consist of a single rod bent into an inverted U connecting the sides of the rim. At the open end of the U in the rim is a baffle 70 having along its upper edge a hinge including a pin 72. The hinge connects the baffle with an apron 74 extending from the baffle and overlying a setback surface 76 of the kettle. To support the baffle and apron in place the ends of the hinge pin rest in U-shaped lugs, one of which is shown at 78 secured within the side walls of the kettle.

For circulating the fat within the kettle and for drawing the fat and frying residue into the sump 60, the sump has an outlet 80 connected with a power driven pump 82. The pressure side of the pump is connected with a tube 84 running beneath the kettle bottom to a coupling 86 just inside the input end wall of the kettle. The coupling 86 joins the tube 84 with a downwardly extending arm of the manifold header 54.

The bottom of the rectangular kettle is heated by an elongated burner pipe 88 running in parallel relation beneath the fat circulating tube 84, a series of flames from the burner pipe impinging on the tube 84 before reaching the kettle bottom. Thus, the heat from the flames produces a high temperature in the fat conducted by the tube 84 before the fat enters the kettle. To regulate the heating action of the burner the outer wall of the sump is intersected by a thermostat 90 connected to a regulating valve (not shown) and to a temperature gage 92.

The pump 82 is constructed and operated to provide a circulation through the kettle sufficient in velocity to sweep the residue from the kettle bottom into the sump. If a circulation is maintained above the required velocity an excessive amount of foam will be recirculated with the fat. Below the required velocity the frying residue will not be swept clear of the kettle bottom.

The action of the baffle 70 is to direct the frying residue into the bottom of the sump 60 where it accumulates. The outlet 80 is located sufficiently high within the sump that the residue does not tend to collect about it. The foam carried from the frying food articles also is drawn to some extent into the sump but is directed with the residue beneath the lower edge of the baffle 70. At the outlet side of the baffle the foam rises and is released from the surface of the fat beneath the apron 74, the apron preventing the spray from the rising and breaking foam bubbles from escaping from the kettle to produce a fire hazard.

The action of a projected current 32 is shown in Fig. 3 while food articles 39 are disposed in a wire basket 75. The projected current has a clear channel through the aligned bottom valley within a free space beneath the basket. The wires of the basket tend to cut off small sections of the projected current and drive them upwardly in the form of the induced circulating currents 34. These currents then curve downwardly again and produce a continuous uniform turbulence, imparting an effective agitation in the food articles 39 not possible with the action of convection currents alone.

The nature and scope of the invention having been indicated and a particular embodiment having been described, what is calimed is:

1. Frying apparatus for treatment of food articles, having a sheet metal kettle arranged to provide a frying zone containing heated fat or oil and formed with a bottom having a plurality of entirely submerged corrugations, into the valleys of which the frying residue is carried and means for heating the bottom of the kettle, in combination with unitary means having jets spaced apart horizontally the same distance as the corrugations for projecting currents of fat along the valleys of the corrugations to sweep the frying residue out of the frying zone and arranged to induce rotating currents of fat within the frying zone and a sump disposed in line with all the corrugations at a lower level than said valleys to receive the residue swept along the valleys by the projected current.

2. Frying apparatus for treatment of food articles, having a sheet metal kettle arranged to provide a frying zone containing heated fat or oil of sufficient depth only to immerse a shallow layer of articles to be treated and formed with a corrugated bottom having a plurality of parallel valleys and submerged apices between them and means for heating the bottom of the kettle, in combination with unitary means for sweeping the frying residue from the frying zone comprising a plurality of spaced jets disposed with the same spacings as the corrugations to project separate currents of fat along the valleys thereof and arranged to induce rotating currents of fat within the frying zone.

3. Frying apparatus for treatment of food articles, having a sheet metal kettle arranged to provide a frying zone containing heated fat or oil of sufficient depth only to immerse a shallow layer of articles to be treated and at the bottom of the kettle with entirely submerged spaced parallel corrugations of circular section and means for heating the corrugated kettle bottom, in combination with unitary means for sweeping the frying residue from the heated corrugations comprising separate jets, each disposed to project a current of fat along one valley of the corrugations and a sump at the ends of the corrugations to receive the frying residue from all the valleys.

4. Frying apparatus for treatment of food articles, having a sheet metal kettle arranged to provide a frying zone containing heated fat or oil of sufficient depth only to immerse a shallow layer of articles to be treated and formed at the bottom of the kettle with entirely submerged corrugations of circular section and means for heating the kettle bottom, in combination with separate jets disposed in parallel relation with the same spacings as the corrugations to sweep the frying residue along the valleys of the corrugations, a sump at the ends of the corrugations and arcuate shields having troughs extending along the valleys from the jets with the concavities of the troughs facing downwardly to deflect the currents projected from the jets against the valleys of the corrugations, there being one shield for each jet.

5. Frying apparatus for treatment of food articles, having a kettle arranged to provide a frying zone containing heated fat or oil of sufficient depth only to immerse a shallow layer of articles to be treated and means for heating the bottom of the kettle, in combination with a jet submerged in the fat in the kettle and directed along the bottom of the kettle and a fan-shaped shield extending from the jet over the heated bottom of the kettle and having formed therein a plurality of inverted arcuate troughs to deflect currents projected by the jet along an extended area of the kettle bottom and to induce rotating currents of fat in the frying zone.

KENNETH L. CHILDS.

References Cited in the file of this patent

UNITED STATES PATENTS

| Number | Name | Date |
|---|---|---|
| 794,292 | Frey | July 11, 1905 |
| 1,473,440 | Pedersen | Nov. 6, 1923 |
| 1,516,962 | Gunsolley | Nov. 25, 1924 |
| 1,569,383 | Lindsey | Jan. 12, 1926 |
| 1,605,203 | Baxter | Nov. 2, 1926 |
| 1,644,516 | Ehrhart | Oct. 4, 1927 |
| 1,996,434 | O'Dowd | Apr. 2, 1935 |
| 2,219,950 | Childs | Oct. 29, 1940 |
| 2,243,661 | Tota | May 27, 1941 |
| 2,418,519 | McBeth | Apr. 8, 1947 |
| 2,455,660 | Dunlop | Dec. 7, 1948 |
| 2,530,920 | Toews | Nov. 21, 1950 |
| 2,546,163 | McBeth | Mar. 27, 1951 |

FOREIGN PATENTS

| Number | Country | Date |
|---|---|---|
| 462,379 | Germany | Apr. 20, 1927 |